United States Patent Office 3,556,644
Patented Jan. 19, 1971

---

3,556,644
SPECTACLE FRAME WITH ADJUSTABLE TEMPLES
Heinz Stahl, Leonberg, Germany, assignor to Optura Dr. Gustav Gammert Brillenfabrik, Leonberg, Germany
Filed Dec. 5, 1967, Ser. No. 688,100
Claims priority, application Germany, Dec. 13, 1966, O 9,117
Int. Cl. G02c 5/16, 5/20
U.S. Cl. 351—118
2 Claims

ABSTRACT OF THE DISCLOSURE

A spectacle frame the temples of which are easily adjustable to different lengths in accordance with the size and shape of the heads of different persons.

---

The present invention relates to spectacle frames and it is the principal object of this invention to design the temples of a spectacle frame so as to be easily adjustable to different lengths in accordance with the different shapes of the heads of different persons.

More particularly, the invention relates to a spectacle frame the adjustable temples of which consist of two adjoining substantially coaxial parts one of which preferably consists of metal and the other preferably of plastic.

Prior to this invention, there have been numerous designs of spectacle frames wherein each temple consisted of a metal part and a plastic part which were rigidly secured to each other so that, if the temples of a spectacle frame did not properly comply with the size and shape of the head of a particular person and especially were either too long or too short, the temples had to be newly bent or shortened or the optician had to keep on stock a variety of frames of the same design with temples of different lengths. However, even when such a frame was properly fitted in accordance with the shape and size of the head of one particular person, it often could not be used by another person, for example, for sun glasses which are frequently used, for example, by different members of a family.

For overcoming these disadvantages the present invention provides each temple of a spectacle frame to consist of two parts one of which preferably consists of plastic which is telescopically slidable over the other part which preferably consists of metal, and to provide these two parts with suitable means for locking them at different positions to each other so as to vary the total length of the temple. These locking means should be of a simple and inexpensive construction and be easily to manipulate. Insofar as the invention is concerned, it is immaterial whether the temples are of the type which are hooked over the ears or are designed so as to press laterally against the head of the wearer.

If the outer of the two telescoping parts is made of plastic or a similar relatively soft material and the inner part consists of metal, it is advisable according to the invention to reinforce the plastic part by securing a metal sleeve to its inner wall which is slidable along the metal part and adapted to be locked thereon by a locking member which may engage into different recesses or serrations in the inner metal part and may be manipulated from the outside. By mounting or guiding this locking member on the metallic sleeve within the plastic part of the temple, the advantage is attained that the relatively soft plastic part will not be damaged by the locking member. According to one preferred embodiment of the invention, the locking member may be cam-shaped and rotatably mounted in the wall of the metal sleeve and be provided on one outer side with a slotted head.

A very simple and advantageous construction of the adjustable temples may be attained by making the end portion of the inner part of each temple which preferably consists of metal of a reduced height and by providing this end portion with a series of adjacent concave recesses into any of which the cam-shaped part of the locking member may engage which is eccentric to its axis of rotation so as to engage into one of the concave recesses when turned to one position and to disengage therefrom when turned to another position at an angle of 90° or 180° to the first position. Of course, instead of providing an eccentric cam part, it is also possible to make this part of an oblong shape or to cut off one side thereof so as to make it of a semicircular cross section.

According to another advantageous embodiment of the invention, the inner, preferably metallic part of each temple may be provided with a longitudinal slot the opposite side walls of which are provided with adjacent concave recesses, and the locking member may then consist of a flat or oval cam which has a maximum thickness in one transverse direction slightly smaller than the minimum width of the slot, while its thickness in a direction at a right angle thereto is equal to the diameter of two opposite recesses. If the locking member is turned so that the cam extends in the longitudinal direction of the slot, the outer plastic part of the temple may be shifted along the inner metal part, and when the locking member is turned at an angle of 90° to its former position, the cam will engage into the walls of two opposite recesses and thereby lock the two temple parts to each other.

Another modification of the invention consists in providing the inner end portion of the inner temple part with a longitudinal slot into which a cam on the locking member engages which when turned in one direction is freely slidable within the slot, while when turned at an angle of 90° thereto, it will press against the opposite walls of the slot and thereby spread apart the slotted end of the inner temple part and press the same against the inner wall of the outer plastic part or the metallic reinforcing sleeve therein. In order to attain a still more secure locking effect, the slotted end portion of the inner temple part may be made of a slightly lower height than the inner height of the metal sleeve in the outer temple part and at least one of the narrow sides of the inner temple part and the corresponding inner side of the sleeve may be provided with serrations which will interlock with each other when the locking member is turned accordingly.

A further modification of the invention consists in providing one side of the inner end portion of the inner temple part with a row of concave transverse grooves and in providing the metal sleeve with a recess in its inner temple part which, when the inner temple part is longitudinally shifted accordingly, is associated with any of the opposite grooves in the latter so as to form a substantially circular bore which is in alignment with a bore in the outer plastic part and into which a pin may be inserted so as to lock the two temple parts in the desired position. Suitable means may be provided to secure this pin within this bore. Thus, for example, if the bore and recess in the outer temple part and its metallic sleeve and the grooves in the inner temple part extend in vertical directions, the pin may be prevented from falling out by making the pin and at least the bore in the outer plastic part of a downwardly tapered shape.

Another simple modification of the invention consists in providing one side of the inner end portion of the inner temple part which is preferably made of metal with a serration into which a likewise serrated locking member, for example, a resilient pin, is inserted through a transverse bore in the outer temple part and the metal sleeve therein so that this pin will be resiliently clamped in the metal sleeve and interlock with several of the serrations on the inner temple part.

The features and advantages of the present invention will become further apparent from the following detailed description thereof which is to be read with reference to the accompanying drawings, in which:

FIGS. 3 and 4 show longitudinal sections similar to FIG. 1 of two modifications of the invention; while

Figure 1:
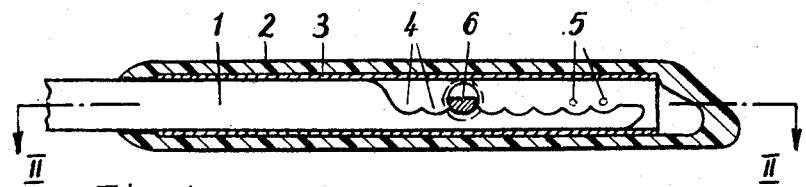
FIG. 1 shows a longitudinal section of a clamping-type temple of a spectacle frame according to the invention.

As illustrated in the drawings, each of the two temples of the spectacle frame consists according to the invention of two main parts 1 and 2 one of which, the part 1 which is connected in the usual manner by a hinge to the spectacle frame itself (not shown), has an end portion which is telescopically inserted into the other part 2. In the drawings, this part 2 is of the type which, together with the corresponding part 2 of the other temple holds the spectacles in the proper position on the head of a person by exerting a slight clamping pressure theeron. The free ends of these parts may, however, also be extended and curved to be hooked over the ears of the wearer. The temple part 1 preferably consists of metal, while the other temple part 2 preferably consists of plastic or a similar material, although it may also consist of metal. If the outer temple part 2 consists of plastic or a similar relatively soft material, it is preferably reinforced by a metal sleeve 3 which is secured to the inner wall thereof.

Figure 2:
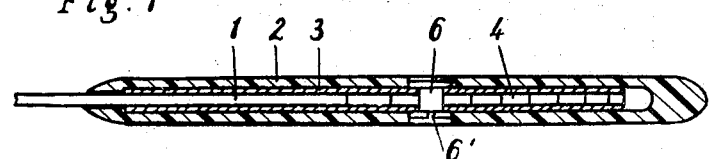
FIG. 2 shows a section which is taken along the line II—II of FIG. 1.

In the embodiment of the invention as illustrated in FIGS. 1 and 2, the metallic temple part 1 has an end portion which is cut down to a reduced width on its upper side which is provided with a series of adjacent concave grooves 4 all of which have a center of curvature 5 in alignment with the axis of rotation of a pin-shaped locking member 6 which is rotatably mounted in the wall of a bore in the metal sleeve 3. Both ends of this locking member 6 are provided with heads which are rotatable within corresponding bores in the plastic part 2. One of these heads 6' is provided with a slot to permit the locking member 6 to be turned from the outside by means of a screwdriver or the like. The central part of the locking member 6 is filed off on one side to form a flat surface. When the locking member 6 is turned to the position as shown in FIG. 1, it engages into one of the grooves 4 in the metal part 1 and thus locks the two temple parts 1 and 2 rigidly together. When the locking member 6 is turned 180° about its axis, its flat side will face the grooves 4 and it will thus be disengaged from the latter so that the plastic part 2 may be shifted along the metal part 1 so as to increase or decrease the total length of the temple 1, 2. When the temple is thus adjusted to the desired length, the locking member 6 is again turned so that its round central part engages into another groove 4 in the metal part 1 and thus again locks the two temple parts 1 and 2 together.

Figure 3:
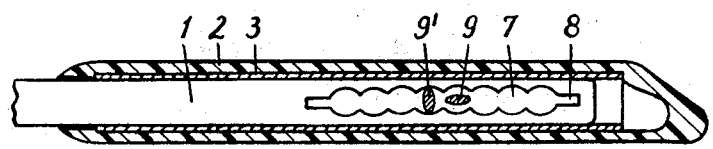

According to another embodiment of the invention as illustrated in FIG. 3, the metal part 1 of the temple is provided with a plurality of adjacent bores 7 which are connected to each other by a longitudinal slot 8. The locking member 9 which is again rotatably mounted in a bore in the wall of sleeve 3 has a locking part of an oblong cross section so that its maximum diameter is equal to the diameter of each bore 7, while its minimum diameter is sligthtly smaller than the width of slot 8. This locking member 9 also extends through a bore in the plastic part 2 so as to be adjustable from the outside. When it is turned so that the longer axis of its locking part extends in the direction of the slot 8, the two temple parts 1 and 2 may be freely shifted in the longitudinal direction relative to each other until the temple has the desired length, whereupon the locking member may be turned to the position 9' in which the maximum diameter of its locking part engages upon the opposite wall portions of one of the bores 7 in the metal part 1 and the two temple parts 1 and 2 are locked to each other. The locking part of the locking member 9 may be either oval or flat with parallel side walls.

Figure 4:
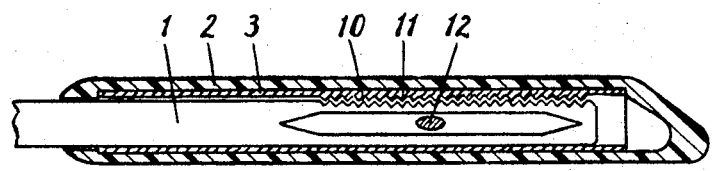

While the two embodiments of the invention according to FIGS. 1 to 3 only permit a relatively coarse length adjustment between the centers of the grooves or bores in the metal part 1, FIG. 4 illustrates a further embodiment which permits a finer length adjustment of the total length of the temple 1, 2. The width of the slotted end portion of the metal temple part 1 is slightly smaller than the inner width of sleeve 3. One lateral edge of the metal part 1 is provided with a row of serrations 10 which correspond to the serrations 11 on the inner wall of sleeve 3. The locking member 12 may be similar to the locking member 9, but its maximum diameter of its locking cam should be slightly larger than the width of the slot in the temple part 1 so that when it is turned in the direction as shown in FIG. 4, the two sets of serrations 10 and 11 will be out of engagement with each other thus permitting the two temple parts 1 and 2 to be shifted longitudinally relative to each other, whereas when the locking member 12 is turned at a right angle to its former position, its locking cam will press against the opposite side walls of the slot and thereby spread these walls resiliently apart so that the serrations 10 on the temple part 1 will interlock with the serrations 11 on the inner wall of sleeve 3. The minimum distance of adjustment of the two temple parts 1 and 2 relative to each other depends on the fineness of the graduation of the two associated serrations 10 and 11. Of course, in place of such serrations, it is also possible to provide one or both longitudinal edges of the metal temple part 1 and also the associated side or sides of the inner wall of the metal sleeve 3 merely with friction surfaces to prevent any longitudinal displacement of the two temple parts 1 and 2 relative to each other when the locking member 12 is in its locking position.

Figure 5:
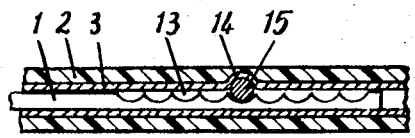
FIG. 5 shows a view similar to FIG. 2 of a further modification of the invention.

FIG. 5 shows a further modification of the invention, in which either one wider or narrower side of the metallic temple part 1 is provided with a row of adjacent concave grooves 13 and the bore in the metal sleeve 3 in which the locking member 15 is mounted is provided off-center so that its wall bulges outwardly at one side. The locking member 15 may be in the form of a pin of a round cross section which engages into the outwardly bulging part of the metal sleeve 3 and into any of the concave grooves 13 in the metallic temple part 1. In order to prevent the locking pin 15 from falling out, the bore in the outer temple part 2 and in the metal sleeve 3 may either be threaded and the locking pin 15 may be screwed therein or, if the bore is provided in the narrow side of the temple parts, it may be tapered in the downward direction and the similarly tapered locking pin 15 may be inserted from above.

While four different embodiments of the invention are illustrated in the drawings, it is obvious that there are numerous other possibilities of guiding the two temple parts along each other and of locking them in the adjusted position to each other. Thus, for example, the inner temple part may be provided with a row of adjacent tapped bores into either of which a screw may be screwed through a bore in the outer plastic part 2 and the metal sleeve 3 into which a headed screw may be screwed which, when loosened, is slidable along a slot in the outer temple part 2 and when tightened presses with its head upon the outer surfaces adjacent to the slot to lock the two temple parts together. The locking member may also simply consist of a setscrew which is screwed through a tapped bore in the outer temple part 2 and against one side of the inner temple part.

Having thus fully disclosed my invention, what I claim is:

1. A spectacle frame having a pair of temples, each of said temples comprising two members guided by each other so as to be slidable longitudinally relative to each other for varying the total length of said temple, wherein a first of said members has an end portion telescopically slidable within and along the second member, and means for locking said two members in the adjusted position to each other comprising a pin-shaped locking element extending transversely from the outside through at least one side wall of said second member and adapted to be secured to said first member at different relative longitudinal positions of said two members, wherein said end portion of said first member has a longitudinal slot therein, said locking element having a locking portion of an oblong cross-section extending into said slot and having a minimum diameter smaller than the width of said slot and a maximum diameter slightly larger than the width of said slot so that, said two members are freely slidable relative to each other and when said locking portion is turned to a second position at a substantially right angle to said first position, it will press against the opposite walls of said slot and thereby press said walls resiliently against the inner walls of said second member and thus lock said two members to each other.

2. A spectacle frame as defined in claim 1, wherein said end portion of said first member has a row of serrations at least on one longitudinal outer side thereof forming one of the walls of said slot, and said second member has a row of corresponding serrations on one inner wall thereof, said serrations of said two rows being disengaged from each other when said locking portion is turned to said first position and being in interlocking engagement with each other when said locking portion is turned to said second position.

References Cited

UNITED STATES PATENTS

| | | | |
|---|---|---|---|
| 3,052,161 | 9/1962 | Berend | 351—118 |
| 3,323,818 | 6/1967 | Winchell | 287—58 |
| 2,443,249 | 6/1948 | Jackson | 351—118 |

FOREIGN PATENTS

| | | | |
|---|---|---|---|
| 335,458 | 9/1930 | Great Britain | 351—118 |
| 1,086,990 | 10/1967 | Great Britain | 351—118 |

DAVID SCHONBERG, Primary Examiner

R. L. SHERMAN, Assistant Examiner

U.S. Cl. X.R.

351—114